US009562593B2

(12) United States Patent
Oishi et al.

(10) Patent No.: US 9,562,593 B2
(45) Date of Patent: Feb. 7, 2017

(54) CHAIN GUIDE AND CHAIN DRIVE APPARATUS

(75) Inventors: Shinji Oishi, Iwata (JP); Akio Kato, Iwata (JP); Takahiro Yamashita, Iwata (JP); Katsufumi Abe, Iwata (JP)

(73) Assignee: NTN CORPORATION, Osaka (JP)

( * ) Notice: Subject to any disclaimer, the term of this patent is extended or adjusted under 35 U.S.C. 154(b) by 112 days.

(21) Appl. No.: 14/125,459

(22) PCT Filed: Jun. 8, 2012

(86) PCT No.: PCT/JP2012/064789
§ 371 (c)(1),
(2), (4) Date: Dec. 11, 2013

(87) PCT Pub. No.: WO2012/173056
PCT Pub. Date: Dec. 20, 2012

(65) Prior Publication Data
US 2014/0274512 A1  Sep. 18, 2014

(30) Foreign Application Priority Data

Jun. 13, 2011 (JP) .................................. 2011-131231
Jul. 28, 2011 (JP) .................................. 2011-165424

(51) Int. Cl.
*F16H 7/08* (2006.01)
*F16H 7/12* (2006.01)
(Continued)

(52) U.S. Cl.
CPC .............. *F16H 7/20* (2013.01); *F16C 13/006* (2013.01); *F16C 33/588* (2013.01); *F16H 7/18* (2013.01);
(Continued)

(58) Field of Classification Search
CPC ............ F16H 2007/0874; F16H 7/1281; F16H 2007/081; F16H 7/1254; F16H 2007/0806
(Continued)

(56) References Cited

U.S. PATENT DOCUMENTS 68,625 A * 9/1867 Hawley ......................... 474/137
993,684 A * 5/1911 Vom Hoff ..................... 474/131
(Continued)

FOREIGN PATENT DOCUMENTS

EP  0 992 697   4/2000
EP  2 395 261   12/2011
(Continued)

OTHER PUBLICATIONS

International Search Report issued Sep. 4, 2012 in International (PCT) Application No. PCT/JP2012/064789.
(Continued)

*Primary Examiner* — Henry Liu
(74) *Attorney, Agent, or Firm* — Wenderoth, Lind & Ponack, L.L.P.

(57) ABSTRACT

An object of the present invention is to provide a chain guide superior in silence, which includes: a guide base extending in a traveling direction of a chain; a plurality of roller shafts attached to the guide base at an interval along the traveling direction of the chain; and rollers each rotatably supported by one of the roller shafts. The roller has a cylindrical outer circumferential surface for guiding the chain. The outer circumferential surface of the roller has a cylindricity not greater than 20 μm.

13 Claims, 8 Drawing Sheets

(51) Int. Cl.
| | |
|---|---|
| F16H 7/20 | (2006.01) |
| F16H 7/18 | (2006.01) |
| F16C 13/00 | (2006.01) |
| F16C 33/58 | (2006.01) |
| F16C 19/46 | (2006.01) |

(52) U.S. Cl.
 CPC .......... F16C 19/466 (2013.01); F16C 2240/40 (2013.01); F16C 2240/56 (2013.01); F16C 2240/60 (2013.01); F16C 2361/63 (2013.01); F16H 7/1281 (2013.01); F16H 2007/0865 (2013.01); F16H 2007/0893 (2013.01)

(58) Field of Classification Search
 USPC .......................................... 474/111, 134, 135
 See application file for complete search history.

(56) References Cited

U.S. PATENT DOCUMENTS

| | | | | |
|---|---|---|---|---|
| 1,338,293 | A * | 4/1920 | Fuchs | 474/134 |
| 1,480,078 | A * | 1/1924 | Kegresse | 180/9.62 |
| 1,499,920 | A * | 7/1924 | Godden | 193/37 |
| 1,579,245 | A * | 4/1926 | Pennington | 305/134 |
| 2,341,273 | A * | 2/1944 | Helberg | 74/501.5 R |
| 2,349,281 | A * | 5/1944 | Kendall | 384/547 |
| 2,709,371 | A * | 5/1955 | Hale | 474/48 |
| 2,729,110 | A * | 1/1956 | Killian et al. | 474/153 |
| 2,827,153 | A * | 3/1958 | Olk et al. | 198/790 |
| 2,892,206 | A * | 6/1959 | Deibel | 15/250.25 |
| 2,964,155 | A * | 12/1960 | Flowers et al. | 193/35 R |
| 3,586,142 | A * | 6/1971 | Inwood et al. | 193/35 R |
| 3,598,194 | A * | 8/1971 | Wappler et al. | 180/6.2 |
| 3,888,217 | A * | 6/1975 | Hisserich | 123/90.31 |
| 3,930,323 | A * | 1/1976 | Marold et al. | 37/423 |
| 3,950,046 | A * | 4/1976 | Lubbersmeyer | 384/546 |
| 3,951,484 | A * | 4/1976 | Bowman, Jr. | 384/603 |
| 4,068,535 | A * | 1/1978 | Sheets | 474/132 |
| 4,078,642 | A * | 3/1978 | Payne | 193/37 |
| 4,208,078 | A * | 6/1980 | Miki | 384/572 |
| 4,213,523 | A * | 7/1980 | Frost et al. | 193/37 |
| 4,416,647 | A * | 11/1983 | White, Jr. | 474/134 |
| 4,416,648 | A * | 11/1983 | Radocaj | 474/135 |
| 4,474,562 | A * | 10/1984 | Heurich | 474/133 |
| 4,610,646 | A * | 9/1986 | Walter et al. | 474/199 |
| 4,626,231 | A * | 12/1986 | Nagano | 474/152 |
| 4,723,516 | A * | 2/1988 | Slagley et al. | 123/90.16 |
| 4,767,387 | A * | 8/1988 | Matsuoka et al. | 474/168 |
| 4,892,508 | A * | 1/1990 | Ryan et al. | 474/101 |
| 4,908,006 | A * | 3/1990 | Burysek et al. | 474/117 |
| 4,913,689 | A * | 4/1990 | Morishita et al. | 474/170 |
| 4,969,548 | A * | 11/1990 | Kornylak | 193/35 R |
| 4,981,116 | A * | 1/1991 | Trinquard | 123/90.31 |
| 5,244,439 | A * | 9/1993 | Rogus | 474/136 |
| 5,441,354 | A * | 8/1995 | Broder et al. | 400/636.3 |
| 5,441,458 | A * | 8/1995 | Rogus | 474/189 |
| 5,848,846 | A * | 12/1998 | Sugiyama et al. | 384/625 |
| 5,961,411 | A * | 10/1999 | Tsutsumi et al. | 474/111 |
| 5,967,925 | A * | 10/1999 | Meckstroth | 474/175 |
| 6,041,490 | A * | 3/2000 | Tabuchi et al. | 29/607 |
| 6,062,998 | A * | 5/2000 | Kumakura et al. | 474/111 |
| 6,179,740 | B1 * | 1/2001 | Walker | 474/134 |
| 6,189,639 | B1 * | 2/2001 | Fuse et al. | 180/231 |
| 6,196,375 | B1 * | 3/2001 | Cozza | 198/836.1 |
| 6,220,211 | B1 * | 4/2001 | Line | 123/90.15 |
| 6,245,436 | B1 * | 6/2001 | Boyle et al. | 428/472.2 |
| 6,254,503 | B1 * | 7/2001 | Chiba et al. | 474/8 |
| 6,346,057 | B1 * | 2/2002 | Edelmann | 474/135 |
| 7,104,909 | B2 * | 9/2006 | Asbeck et al. | 474/135 |
| 7,419,447 | B2 * | 9/2008 | Serkh | 474/134 |
| 7,780,556 | B2 * | 8/2010 | Sakanaka et al. | 474/8 |
| 7,866,292 | B2 * | 1/2011 | LaBere et al. | 123/90.31 |
| 7,909,717 | B2 * | 3/2011 | Boussaguet et al. | 474/136 |
| 8,282,289 | B2 * | 10/2012 | Oishi | 384/572 |
| 8,684,895 | B2 * | 4/2014 | Severing et al. | 492/58 |
| 2001/0053727 | A1 * | 12/2001 | Nakashima et al. | 474/242 |
| 2002/0018607 | A1 | 2/2002 | Yajima et al. | |
| 2002/0057857 | A1 | 5/2002 | Yajima et al. | |
| 2002/0121021 | A1 | 9/2002 | Kodama et al. | |
| 2003/0092521 | A1 * | 5/2003 | Konno | 474/111 |
| 2004/0002401 | A1 * | 1/2004 | Iverson | 474/134 |
| 2004/0116224 | A1 * | 6/2004 | Sakamoto | 474/152 |
| 2005/0031240 | A1 * | 2/2005 | Dodoro et al. | 384/494 |
| 2006/0153485 | A1 * | 7/2006 | Maeda et al. | 384/569 |
| 2007/0026986 | A1 * | 2/2007 | Walker | 474/134 |
| 2007/0110348 | A1 * | 5/2007 | Obara | 384/107 |
| 2008/0070731 | A1 * | 3/2008 | Vrsek et al. | 474/134 |
| 2010/0160102 | A1 * | 6/2010 | Haag et al. | 474/166 |
| 2011/0294612 | A1 * | 12/2011 | Kato | 474/91 |
| 2013/0324339 | A1 * | 12/2013 | Kato et al. | 474/137 |
| 2013/0331211 | A1 * | 12/2013 | Kato et al. | 474/101 |

FOREIGN PATENT DOCUMENTS

| | | | |
|---|---|---|---|
| JP | 62-172847 | 11/1987 | |
| JP | 9-236157 | 9/1997 | |
| JP | 11-44349 | 2/1999 | |
| JP | 2004-108514 | 4/2004 | |
| JP | 2010-180900 | 8/2010 | |
| JP | 2011-58552 | 3/2011 | |
| JP | 2011-89553 | 5/2011 | |
| WO | 2010/090139 | 8/2010 | |
| WO | WO 2010090139 A1 * | 8/2010 | F16H 7/08 |

OTHER PUBLICATIONS

Notification of Reason(s) for Refusal issued Nov. 25, 2014 in corresponding Japanese Application No. 2011-131211, with English translation.

Notification Concerning Transmittal of International Preliminary Report on Patentability (Chapter I of the Patent Cooperation Treaty) and Notification of Transmittal of Copies of Translation of the International Preliminary Report on Patentability (Chapter I or Chapter II) issued Jan. 3, 2014 in Application No. PCT/JP2012/064789.

Supplementary European Search Report issued Mar. 9, 2015 in corresponding European Patent Application No. 12799729.4.

* cited by examiner

CHAIN GUIDE AND CHAIN DRIVE APPARATUS

TECHNICAL FIELD

The present invention relates to a chain guide for guiding a torque transmission chain, and to a chain drive apparatus including the chain guide.

BACKGROUND ART

In automotive engines, crankshaft rotation is transmitted to a cam shaft via a timing chain (hereinafter simply called chain), and valves in combustion chambers are opened/closed as the cam shaft rotates.

Often, driving of the cam shaft as described above is achieved by a transmission apparatus or chain drive apparatus, which includes a drive sprocket attached to a crankshaft; a driven sprocket attached to the cam shaft; a chain wound around the drive sprocket and the driven sprocket; and a pivotable chain guide disposed on a slack side of the chain; a chain tensioner which presses the chain guide toward the chain; and a fixed chain guide disposed on a tension side of the chain.

In this arrangement, the pivoting chain guide presses the chain with the chain tensioner's urging force, thereby keeping the chain under a constant tension whereas the fixed chain guide reduces chain vibration while keeping an ideal chain tracking line.

The pivoting chain guide and the fixed chain guide used in such a chain drive apparatus as described above are typically of a sliding type, having a guide surface extending in a chain tracking direction for making sliding contact with the chain. A problem with this type of chain guides is a large transmission loss of torque due to a large tracking resistance of the chain since the contact with the chain is sliding contact.

In an attempt to solve such a problem as this, there are proposed chain guides (Patent Literature 1 through 3) each including a guide base extending in a chain tracking direction; a plurality of roller shafts attached to the guide base at an interval along the chain tracking direction; and rollers each supported rotatably by one of the roller shafts. In these chain guides, each roller has a cylindrical outer circumferential surface for guiding the chain.

These chain guides make use of rolling contact with the chain and therefore, the chain has a smaller tracking resistance, which results in an advantage of smaller transmission loss of the torque.

CITATION LIST

Patent Literature

PATENT LITERATURE 1: WO 2010/090139
PATENT LITERATURE 2: JP-A-H9-236157
PATENT LITERATURE 3: JP-A-2010-180900

SUMMARY OF INVENTION

Technical Problem

The inventors of the present invention built a tester for performance evaluation of rolling-type chain guides. The tester included a drive sprocket attached to a crankshaft; a driven sprocket attached to a cam shaft; a chain wound around them; and rolling-type chain guides for guiding the chain along its track. The tester's crankshaft was rotated within a range above 0 through up to a maximum limit of rotation speed.

As a result, it was demonstrated that use of the rolling-type chain guide can reduce chain tracking resistance by approximately 20 through 50 percent as compared to the case where a sliding-type chain guide was used. Another result, however, was that use of the rolling-type chain guide tends to generate louder chain tracking noise than in the case where a sliding-type chain guide was used.

An object of the invention is to provide a chain guide superior in silence.

Solution to Problem

The inventors of the present invention found a reason why chain tracking noise is louder when a rolling-type chain guide is used: when the engine camshaft drive chain is being guided, rollers make contact with the chain while they are rotating at high speeds, and therefore even a very small dimensional error in the roller's outer circumferential surface generates contact pressure fluctuation between the chain and the rollers, and this contact pressure fluctuation causes the chain to vibrate, generating the noise.

In order to solve the problem, the present invention provides a chain guide which includes: a guide base extending in a traveling direction of a chain; a plurality of roller shafts attached to the guide base at an interval along the travelling direction of the chain; and rollers each supported rotatably by one of the roller shafts. Each roller has a cylindrical outer circumferential surface for guiding the chain, and the outer circumferential surfaces of the rollers have a cylindricity not greater than 20 μm.

According to the arrangement described above, contact pressure between the chain and the rollers is less likely to fluctuate when the roller makes contact while rotating at high speeds. Therefore, the chain is less likely to vibrate, and thus the invention is capable of efficiently reducing the operating noise of the chain.

The roller can be provided by a roller bearing which includes an outer ring and a plurality of bearing rollers incorporated therein. The roller bearing can be used as it is, with an outer circumferential surface of the outer ring of the roller bearing serving as the outer circumferential surface of the roller. The outer ring is provided by a heat-treated product whereby wear resistance on the outer circumferential surface can be ensured. However, performing a heat treatment on the outer ring causes decrease in cylindricity of the outer ring's outer circumferential surface due to thermal strain. For this reason, the outer ring should preferably have a wall thickness of not smaller than 1.0 mm. Such an arrangement increases stiffness of the outer ring. This leads to smaller amount of cylindricity decrease caused by the heat treatment, making it possible to obtain an outer ring which includes an outer circumferential surface of a cylindricity not greater than 20 μm.

The outer ring can be provided by a shell-type outer ring formed by means of a drawing process of a steel plate. This is lower in cost than using a solid-type outer ring formed by machining process. Generally, a shell-type outer ring is designed to have a wall thickness of 0.5 mm through 0.8 mm in order to make the drawing process easier. However, according to the present invention, the shell-type outer ring preferably has a wall thickness of 1.0 mm through 3.0 mm. The wall thickness not smaller than 1.0 mm increases stiffness of the shell-type outer ring. This leads to smaller amount of cylindricity decrease caused by the heat treatment, making it possible to obtain a shell-type outer ring which includes an outer circumferential surface of a cylindricity not greater than 20 μm. If the shell-type outer ring has a wall thickness greater than 3.0 mm, the drawing process for formation of the outer ring must then be performed in a plurality of steps, resulting in increase in cost of drawing machinery and cost of dies as well. Therefore, the wall thickness of the outer ring is preferably selected to be not greater than 3.0 mm.

The outer ring may include: a straight region having a constant outer diameter; a rounded region which has an arc-shaped section at each end of the straight region; and a flange region extending radially inward from each rounded region. The rounded regions each having an arc-shaped section and formed at the end of the outer ring protect the guide base from wear by reducing aggressiveness to the guide base when there is contact between the end of the outer ring and the guide base.

The arc on an outer surface of the rounded region preferably has a radius which is between 0.5 mm through 1.5 mm. Setting the arc radius to be not smaller than 0.5 mm efficiently reduces aggressiveness to the guide base when the end of the outer ring makes contact with the guide base. Also, by setting the arc radius to not greater than 1.5 mm, it becomes possible to give a sufficient length to the straight region thereby guiding the chain stably while controlling the overall length of the outer ring.

The roller shaft is preferably provided by a heat-treated solid columnar member. The arrangement ensures wear resistance of the roller shaft since the roller shaft is hardened by heat treatment. Also, since the roller shaft is solid, the arrangement reduces decrease in cylindricity on the surface of the roller shaft caused by thermal strain, making it possible to reduce rotation noise from the rollers.

Also, the present invention provides a chain drive apparatus which includes a drive sprocket; a driven sprocket; a chain wound therearound; a pivotable chain guide which is provided by the above-described chain guide and is disposed on a slack side of the chain; and a chain tensioner for pressing the chain guide toward the chain.

If the apparatus further includes a fixed chain guide on the chain's tension side, the fixed chain guide may also be provided by the above-described chain guide.

Advantageous Effects of Invention

According to the chain guide offered by the present invention the outer circumferential surface of the roller has a cylindricity not higher than 20 μm, and therefore the contact pressure between the chain and the rollers is less likely to fluctuate when the rollers make contact with the chain while rotating at high speeds. Therefore, the chain is less likely to vibrate, i.e., the chain guide is capable of efficiently reducing the operating noise of the chain, and is superior in silence.

DESCRIPTION OF EMBODIMENTS

Figure 1:
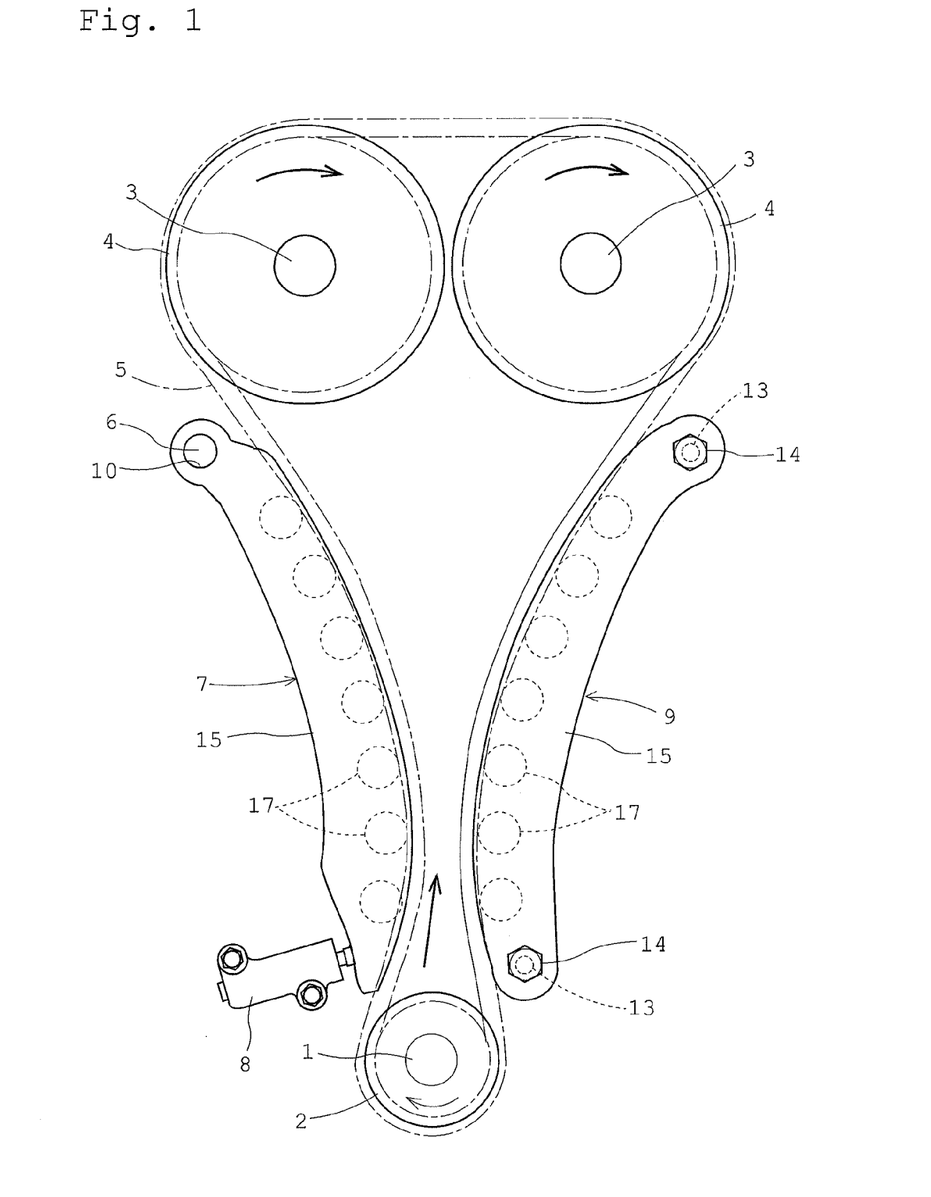
FIG. 1: A schematic view of a chain drive apparatus according to an embodiment of the present invention

FIG. 1 shows a chain drive apparatus which includes chain guides according to an embodiment of the present invention. This chain drive apparatus includes: a drive sprocket 2 which is fixedly attached to a crankshaft 1 of an engine; a driven sprocket 4 which is fixedly attached to a cam shaft 3; and a chain 5 which is wound around the drive sprocket 2 and the driven sprocket 4. The chain 5 which transmits rotation of the crankshaft 1 to the cam shaft 3, so that valves (not illustrated) in combustion chambers are opened/closed as the cam shaft 3 rotates.

When the engine is operating, the crankshaft 1 makes rotation in a predetermined direction (clockwise in the figure). The chain 5, which is driven as the crankshaft 1 rotates, has a tension side or the side pulled by the drive sprocket 2, and a slack side or the side leaving the drive sprocket 2. On the slack side of the chain 5, there are provided a chain guide 7 which is supported pivotably around a pivot shaft 6; and a chain tensioner 8 which presses the chain guide 7 toward the chain 5. On the other hand, a fixed chain guide 9 is provided on the tension side of the chain 5.

The chain guide 7 is long, extending in an up-down direction along the chain 5, has an upper end region with an insertion hole 10, into which the pivot shaft 6 is inserted, and therefore is supported pivotably around the pivot shaft 6. The chain guide 7 has a swinging end, which makes contact with the chain tensioner 8. The chain tensioner 8 urges the chain guide 7 toward the chain 5.

Like the chain guide 7, the chain guide 9 is also long, extending in an up-down direction along the chain 5. The chain guide 9 has insertion holes 13 at its upper and lower end regions, and a bolt 14 is inserted into each hole. The bolts 14 are tightened to fix the guide in place.

A difference between the pivoting chain guide 7 and the fixed chain guide 9 is that the pivoting chain guide 7 has an end region formed with the insertion hole 10 for insertion of the pivot shaft 6 for pivoting action whereas the fixed chain guide 9 has each of its both end regions formed with the insertion hole 13 for insertion of the fixing bolt 14. However, this is the only difference, and these two guides are identical with each other in all the other aspects.

For this reason, description hereinafter will cover primarily the pivoting chain guide 7, and all identical parts in the fixed chain guide 9 will be indicated by using the same reference symbols, without any description thereof.

Figure 2:
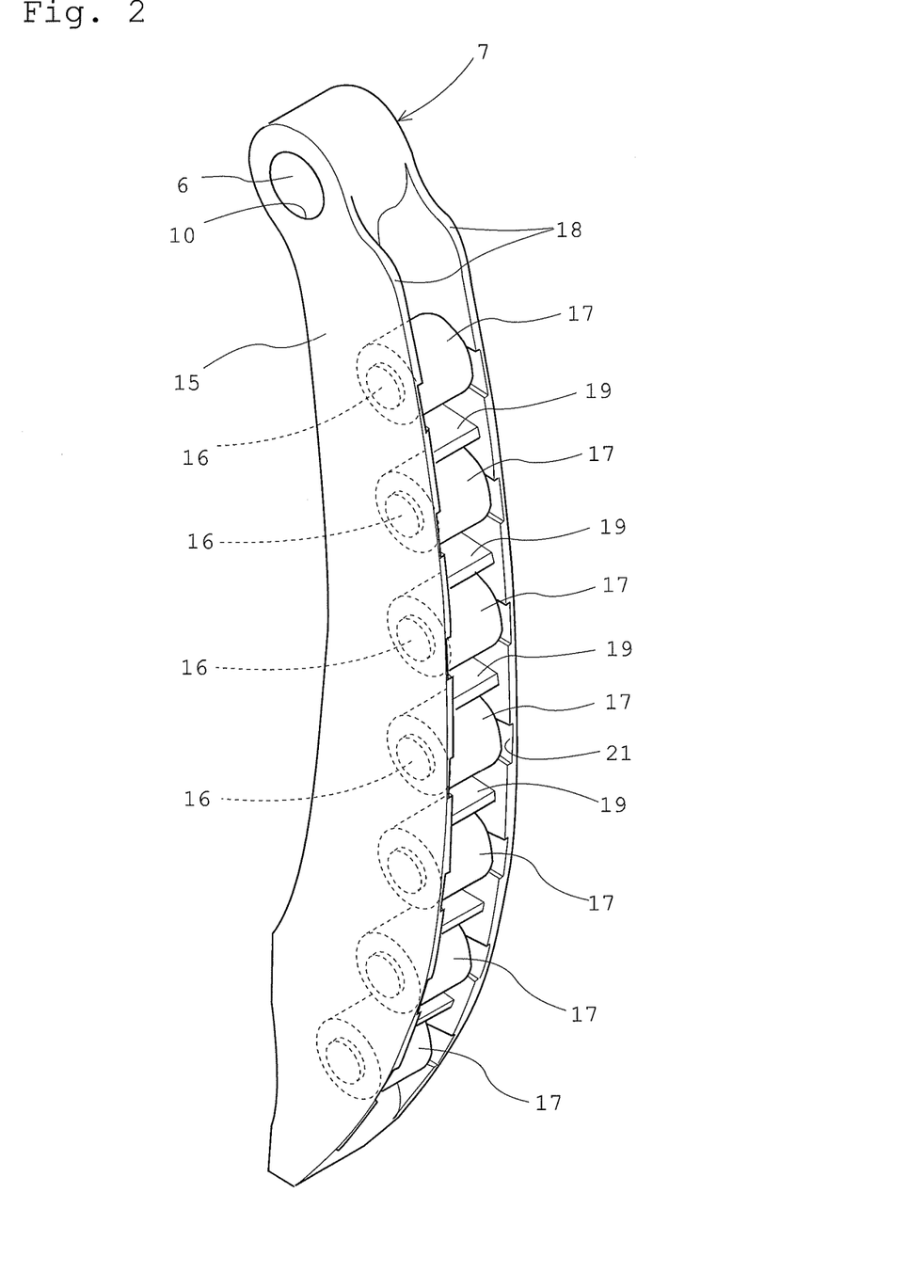
FIG. 2: A perspective view of a chain guide in FIG. 1
Figure 3:
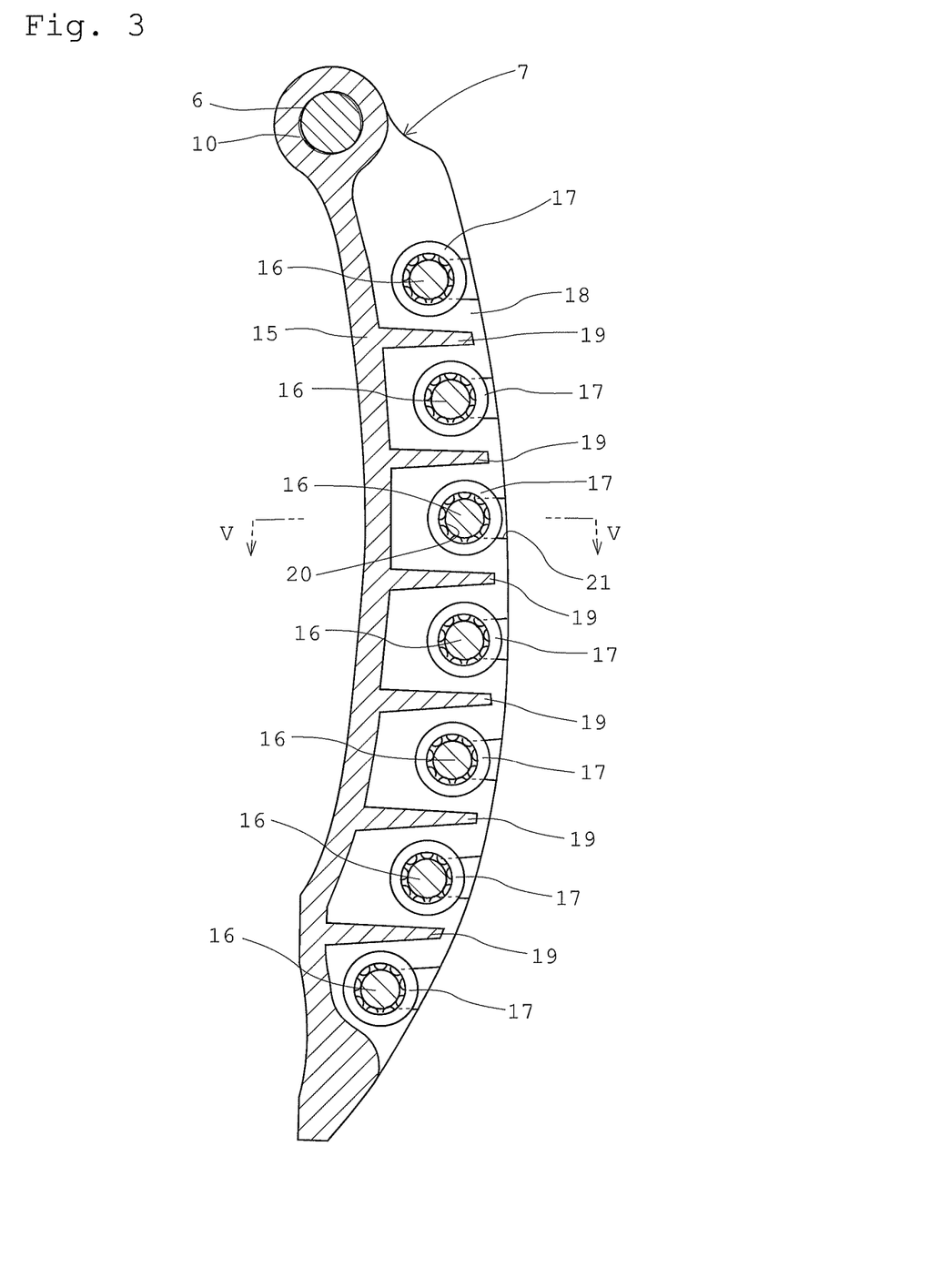
FIG. 3: A longitudinal sectional view of the chain guide in FIG. 2
Figure 4:
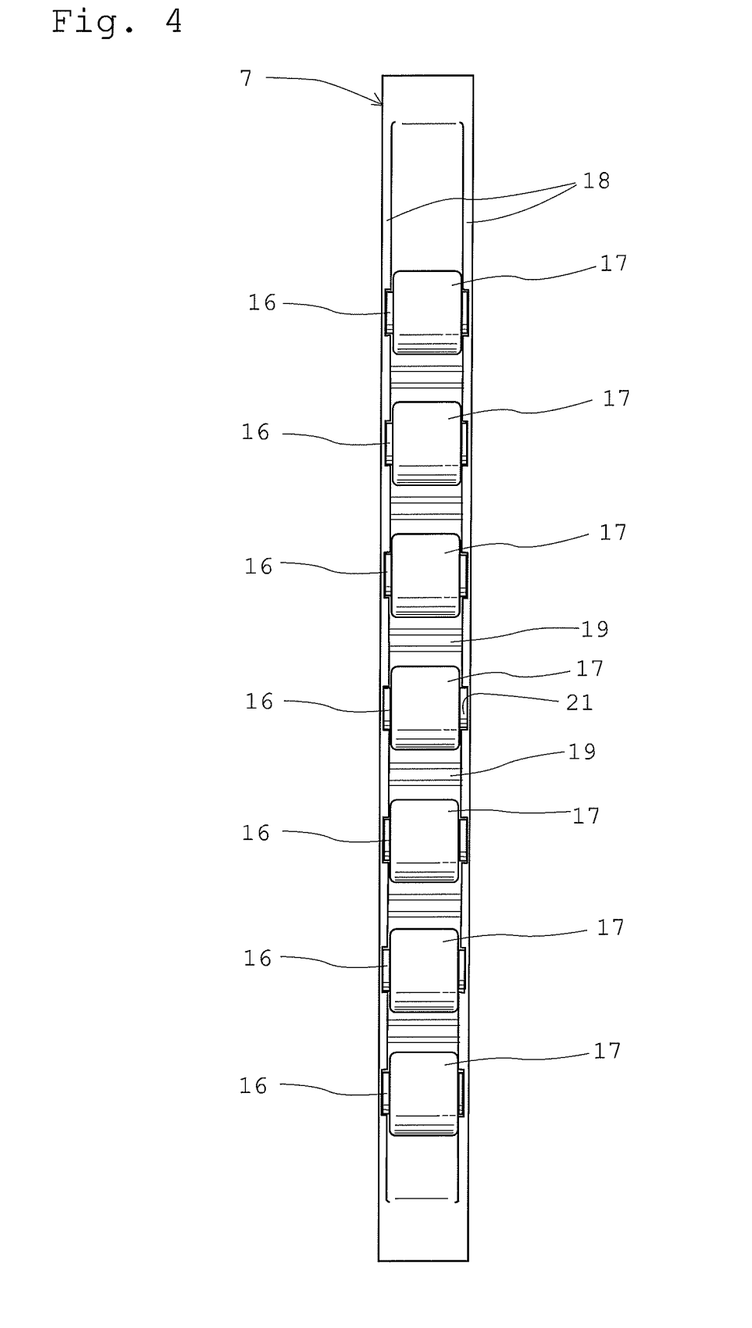
FIG. 4: A right side view of the chain guide in FIG. 3

As shown in FIG. 2 through FIG. 4, the chain guide 7 includes a guide base 15 extending in a traveling direction of the chain 5; a plurality of roller shafts 16 attached to the guide base 15 at an interval along the traveling direction of the chain 5; and rollers 17 each supported rotatably by one of the roller shafts 16.

Figure 7:
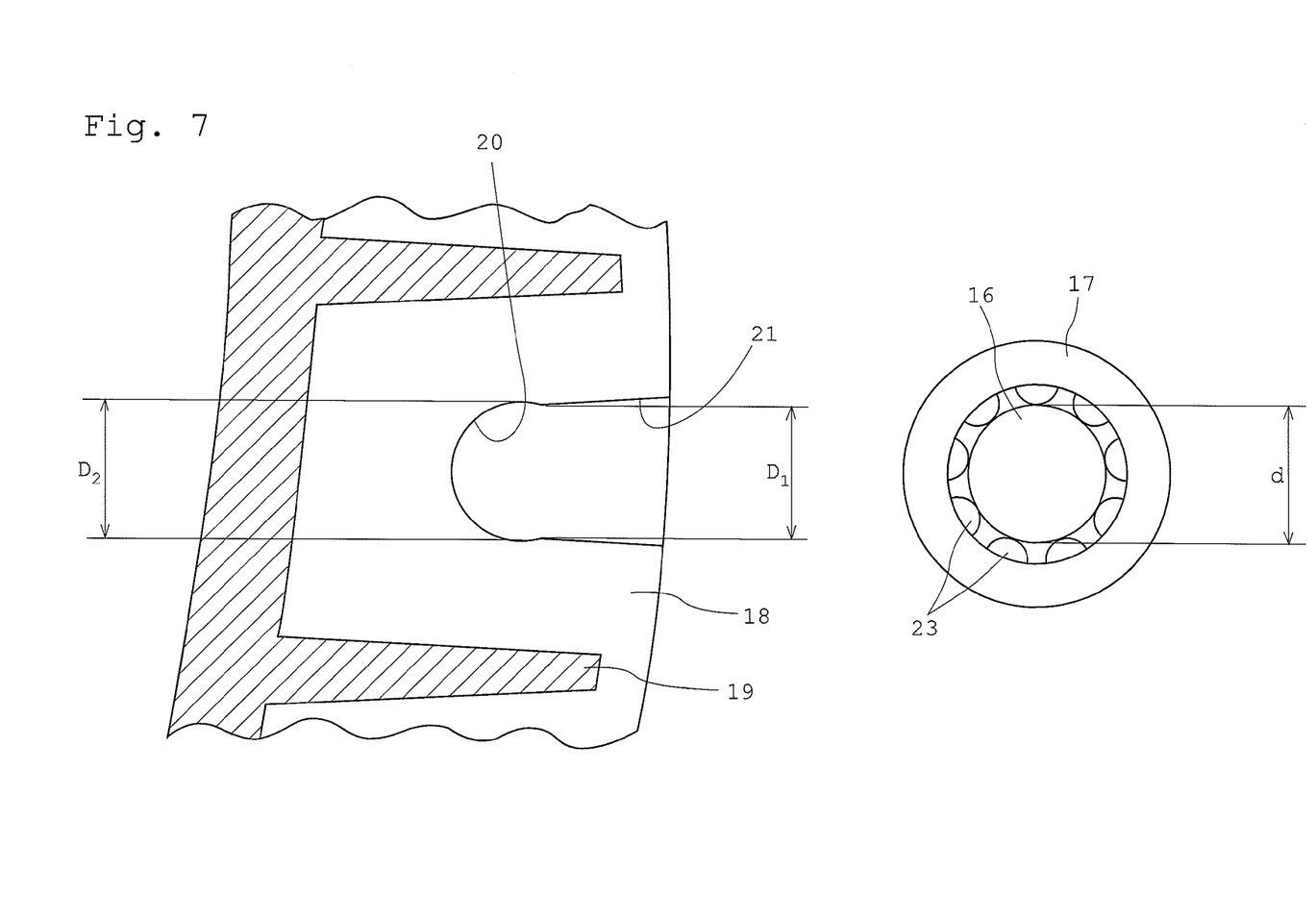
FIG. 7: An exploded front view, showing part of a guide base and a roller

The guide base 15 has a pair of mutually opposed side plates 18, 18 extending along the traveling direction of the chain 5 for supporting two ends of each roller shafts 16; and connecting portions 19 each disposed between two mutually adjacent roller shafts 16 for connecting the side plates 18, 18 with each other. Each connecting portion 19 has two side ends each fixed to one of the side plates 18, to keep a distance between the two side plates 18. As shown in FIG. 3 and FIG. 7, an opposed surface in each side plate 18 is provided with circular recesses 20 for supporting ends of the roller shaft 16; and shaft insertion grooves 21 each leading to one of the circular recesses 20 from a convex edge of the side plate 18.

As shown in FIG. 7, the shaft insertion groove 21 is tapered so that its groove width becomes gradually narrower from the convex edge of the side plate 18 toward the circular recess 20. The shaft insertion groove 21 serves as a guide groove when placing an end of the roller shaft 16 into the circular recess 20. In order to prevent the end of the roller shaft 16 once placed into the circular recess 20 from coming back to the shaft insertion groove 21, the shaft insertion groove 21 has a narrowed region with a width D1, which is smaller than an inner diameter D2 of the circular recess 20.

The inner diameter D2 of the circular recess 20 is slightly smaller than an outer diameter d of the roller shaft 16, so that the end of the roller shaft 16 is press-fitted into the circular recess 20.

The guide base 15 may be made by means of injection molding, of a fiber-reinforced synthetic resin material. The synthetic resin may be provided by, e.g., a polyamide (PA) such as nylon 66 or nylon 46. Examples of the reinforcing material to be blended with the synthetic resin includes glass fibers, carbon fibers and aramid fibers. The guide base 15 may be made of a light metal such as an aluminum alloy or a magnesium alloy.

The roller shaft 16 is a solid columnar piece made of a steel material such as SUJ2 and SC steel, with its surface wear resistance improved by heat treatment. The heat treatment may be bright hardening or high-frequency hardening. Since the roller shaft 16 is provided by a solid piece of metal rather than a hollow tube, the present invention makes it possible to reduce deterioration in cylindricity on the surface of the roller shaft 16 caused by thermal strain, and therefore makes it possible to reduce rotation noise from the roller 17.

Figure 5:
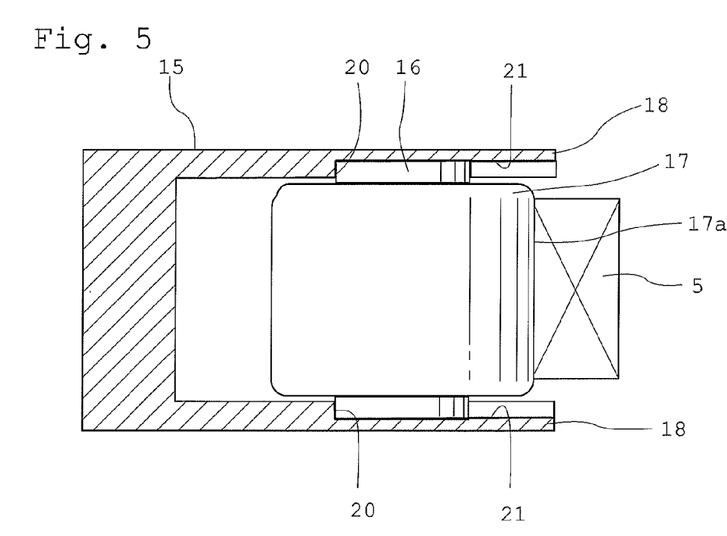
FIG. 5: A sectional view taken in lines V-V in FIG. 3
Figure 6:
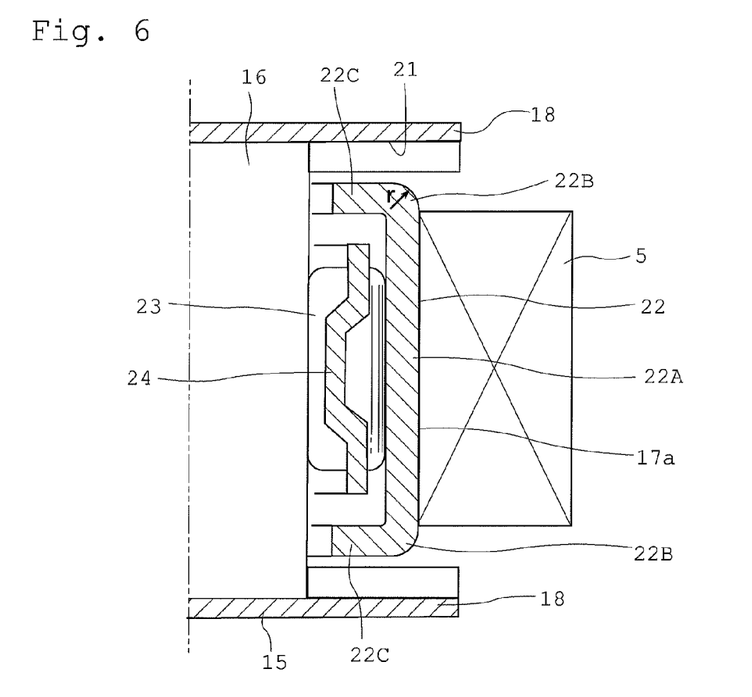
FIG. 6: An enlarged sectional view of a roller shown in FIG. 5

As shown in FIG. 5 and FIG. 6, the roller 17 is mounted rotatably around an outer circumference of the roller shaft 16. The roller 17 has a cylindrical outer circumferential surface 17a, which makes contact with and thereby guides the chain 5. The roller 17 is provided by a roller bearing which includes: an outer ring 22; a plurality of bearing rollers 23 which are assembled to an inner side of the outer ring 22; and a retainer 24 which holds these bearing rollers 23.

As shown in FIG. 6, the outer ring 22 is provided by a shell-type outer ring which is manufactured by means of drawing a steel plate of, e.g., SPC and SCM, into a shape of a cup having a straight region 22A of a constant outer diameter; a rounded regions 22B having an arc-shaped section at each end of the straight region 22A; and a flange region 22C extending radially inward from each of the rounded regions 22A. The rounded regions 22B each having an arc-shaped section and formed at the end of the outer ring 22 protect the guide base 15 from wear by reducing aggressiveness to the guide base 15 when there is contact between the end of the outer ring 22 and the guide base 15.

The outer ring 22 is a heat-treated product having an enhanced hardness due to the heat treatment. The heat treatment ensures wear resistance of the outer circumferential surface 17a. Examples of the heat treatment performed to the outer ring 22 include high-frequency hardening, carburizing and carbonitriding. After the heat treatment, the outer circumferential surface 17a of the outer ring 22 has a cylindricity not greater than 20 μm.

The term cylindricity of the outer circumferential surface 17a as used herein is defined as the smallest radial distance between two hypothetical concentric cylinders between which all points on the outer circumferential surface 17a are included.

Generally, a shell-type outer ring whose outer diameter is not greater than 25 mm is designed to have a wall thickness of 0.5 mm through 0.8 mm in order to make the drawing process easier. However, according to the present invention, the outer ring 22 has a wall thickness of 1.0 mm through 3.0 mm. A wall thickness of the outer ring 22 not thinner than 1.0 mm increases stiffness of the outer ring 22, which leads to smaller amount of cylindricity deterioration caused by the heat treatment in the outer circumferential surface 17a, making it possible to obtain a shell-type outer ring which includes an outer circumferential surface 17a of a cylindricity not greater than 20 μm. If the outer ring 22 has a wall thickness greater than 3.0 mm, the drawing process for formation of the outer ring 22 must then be performed in a plurality of steps, resulting in increase in cost of drawing machinery and cost of dies as well. Therefore, the wall thickness of the outer ring 22 is preferably selected to be not greater than 3.0 mm.

The straight region 22A of the outer ring 22 has an outer diameter between 10 mm through 25 mm. The arc on an outer surface of the rounded region 22B has a radius "r" which is between 0.5 mm through 1.5 mm. The radius "r" of the arc not smaller than 0.5 mm efficiently reduces aggressiveness to the sideplate 18 when there is contact between the end of the outer ring 22 and the side plate 18 of the guide base 15. Also, by setting the arc radius "r" not greater than 1.5 mm, it becomes possible to give a sufficient length to the straight region 22A while controlling the overall length of the outer ring 22, enabling to guide the chain 5 stably.

Figure 8:
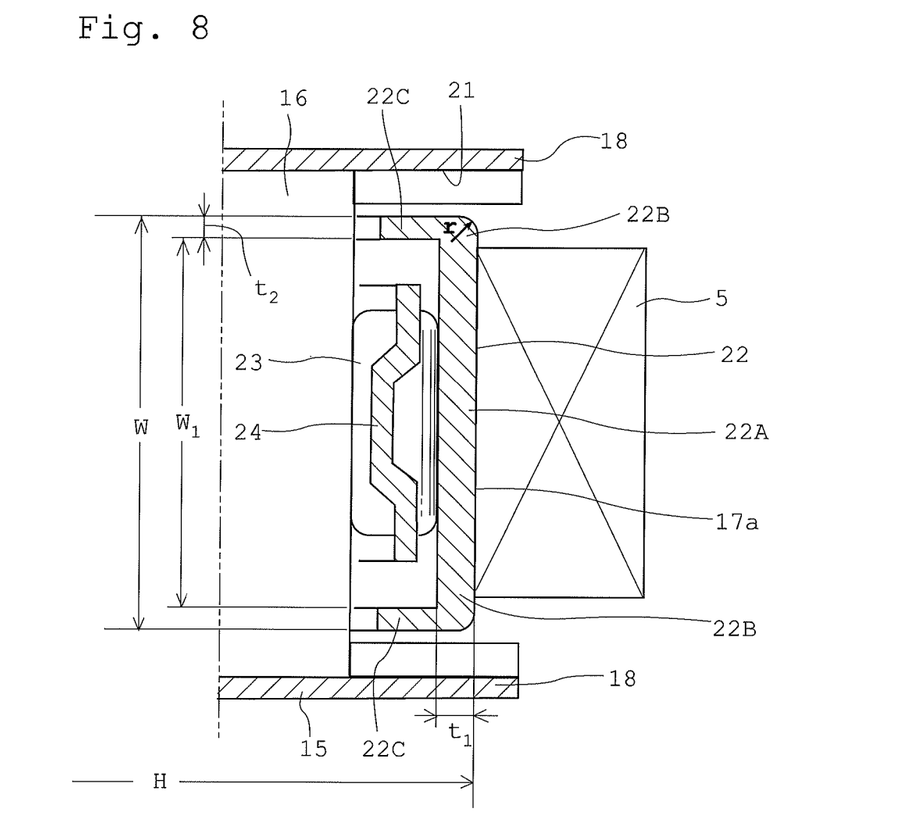
FIG. 8: An enlarged sectional view of a roller according to another embodiment according to the present invention

FIG. 8 shows an embodiment in which the outer ring 22 has a wall thickness $t_1$, the flange regions 22C have a wall thickness $t_2$, and the wall thickness $t_2$ of the flange regions 22C is thinner than the wall thickness $t_1$ of the outer ring 22. In this embodiment, the wall thickness of the flange regions 22C is made thinner than the wall thickness of the outer ring 22, which makes it possible to decrease an end surface r. This increases a width W of the outer ring 22, i.e., the width of contact with the chain 5. The greater width allows stabler contact between the roller 17 and the chain 5 which is travelling at high speeds; in other words, the arrangement enables to increase tracking stability of the chain 5.

The width W of the outer ring 22 has a specific relationship with a diameter H of the outer ring 22. Specifically, the width W of the outer ring 22 is not smaller than 80 percent the diameter H of the outer ring 22. This setting increases tracking stability of the chain 5.

Reducing the wall thickness $t_2$ of the flange regions 22C makes it possible to increase the width of the retainer 24 and the length of the bearing rollers 23, which leads to improved load capacity of the roller bearings. If W is not greater than 80 percent of H, bearing rollers in the bearing will have to be insufficiently short, posing a problem that the bearing may tilt and destabilize chain travel when the chain 5 wobbles axially of the bearing.

Since the outer ring 22, which makes contact with the chain 5, is made of steel, the outer ring has a high level of strength. Also, the steel outer ring 22 should preferably have a higher hardness than the chain 5 for better wear prevention.

Materials for the outer ring 22 may be SUJ2, SCM, and others which can be hardened by means of heat treatment.

When the outer ring 22 is hardened by heat treatment, the depth of hardening should preferably be not shallower than 0.05 mm.

The outer ring 22 may have a finely asperous surface for improved lubricant holding capabilities.

Also, the surface of the outer ring 22 may receive nitridation process for improved strength.

The outer ring 22 should preferably have a surface defined by a barrel-like or a straight generatrix so as to avoid localized surface pressure caused by point contact with the chain 5.

The outer ring 22 can be formed by means of press forming or machining process.

When a press formation method is employed to form the outer ring 22, it is preferable that the inward facing flange regions 22C at both ends should be formed by edge bending operation after the retainer 24 and bearing rollers 23 have been incorporated, and heat treatment process should be performed after the assembly.

Next, as shown in FIG. 7 and FIG. 8, once the roller shaft 16 is fitted between the side plates 18, 18, the outer ring 22, which represents a part of the roller bearing constituting the roller 17, is lower than end surfaces of the guide base 15. This ensures that the chain 5 is guided to stay between the opposed wall surfaces of the guide base 15 while making contact with the outer rings 22 of the bearings which constitute the rollers 17, i.e., the arrangement prevents the moving chain 5 from coming out from between the opposed wall surfaces of the guide base 15.

In addition, it is preferable that the outer ring 22 of the roller bearing which serves as a constituent part of the roller 17 should give the end surfaces of the guide base 15 a lower height than a position where there is a chain connecting pin which connects chain links with each other as a part of the chain 5. If the height from the outer ring 22 to the end surface of the guide base 15 is higher than the position of the connecting pins which connect the chain plates with each other in the chain 5, the connecting pin makes undesirable contact with the two mutually opposed walls of the guide base 15.

Figure 9:
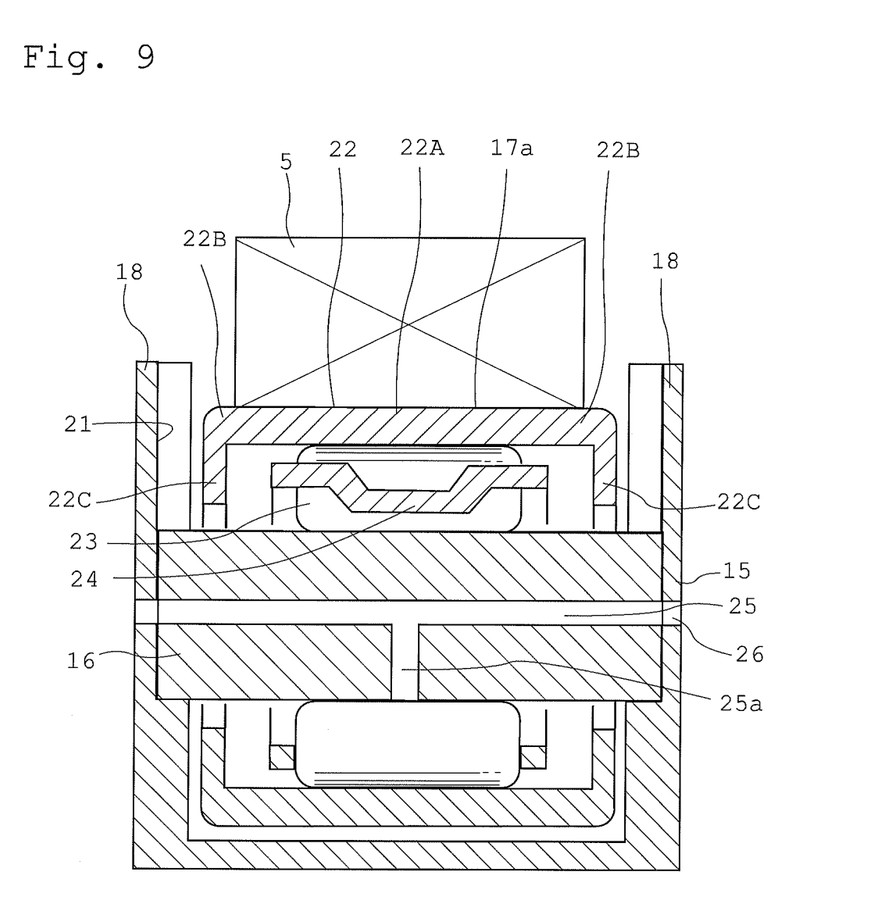
FIG. 9: An enlarged sectional view of a roller according to still another embodiment according to the present invention

Next, FIG. 9 is a cross-sectional view of another embodiment of the present invention. In describing this embodiment, any parts and components which are identical with those used in the previous embodiment described thus far will be indicated by the same reference symbols and their description will not be repeated. The following description will be focused on differences. In the present embodiment, as shown in FIG. 9, the roller shaft 16 has a lubrication hole 25 at its center, and an oil discharge hole 25a on the side away from the chain 5. With the above, the guide base 15 has holes 26 which communicate with the lubrication hole 25. By forming the lubrication hole 25 as described, it becomes possible to supply oil to inside of the bearing. This also helps releasing heat. The discharge hole 25a of the lubrication hole 25 should preferably made on the side which is away from the chain 5 since this provides smooth supply of oil to the inside of the bearing. With lubrication hole 25a the roller shaft 16 is now hollow, which provides another advantage of reduced weight.

Next, an operation of the chain drive apparatus which has the above arrangement will be described.

While the engine is running, the chain 5 travels around the drive sprocket 2 and the driven sprocket 4, and the chain 5 transmits a torque from the crankshaft 1 to the cam shaft 3. In this process, the pivoting chain guide 7 presses the chain 5 with an urging force from the chain tensioner 8, thereby keeping the chain 5 under a constant tension whereas the fixed chain guide 9 reduces chain vibration while keeping an ideal tracking line of the chain 5.

Under this circumstance, each of the rollers 17 in the chain guides 7, 9 rotates as they make contact with a back-side edge of each chain link which constitutes the chain 5. Since the contact between the chain 5 and the chain guides 7, 9 is rotating contact, travel resistance of the chain 5 is small and therefore torque transmission loss is small.

Generally, an engine crankshaft has a maximum number of revolutions of approximately 8000 rpm. On the other hand, even when the crankshaft is rotating at 3000 rpm, the rollers 17 are rotating at a much higher speed of approximately 6000 rpm through 9000 rpm. Because the rollers 17 are rotating such a high speed when they make contact with the chain 5, even a very small dimensional error in the outer circumferential surfaces 17a of the rollers 17 causes fluctuation in contact pressure between the chain 5 and the rollers 17. The contact pressure fluctuation causes the chain 5 to vibrate, which then may increase operating noise of the chain 5.

According to the chain guide offered by the present embodiments, however, the outer circumferential surfaces 17a of the rollers 17 have a cylindricity not higher than 20 μm, and therefore the contact pressure between the chain 5 and the roller 17 is less likely to fluctuate when the roller 17 makes contact while rotating at high speeds. Therefore, the chain 5 is less likely to vibrate, i.e., the chain guide is capable of efficiently reducing the operating noise of the chain 5, and is superior in silence.

In the above-described embodiments, the rollers 17 are provided by roller bearings, and their outer rings 22 have their outer circumferential surfaces serving as the outer circumferential surface 17a of the rollers 17 in order to reduce the weight of the rollers 17 thereby minimizing travel resistance of the chain 5. Alternatively, however, a cylindrical member made of resin may be fitted tightly around each outer ring 22 of the roller bearings, so that the cylindrical member's outer circumferential surface serves as the outer circumferential surface 17a of the roller 17. Also, the outer ring 22 may be provided by a solid-type outer ring formed by means of machining process. Further, the roller bearings may be replaced by bearings of another type. Note that the term roller bearing refers to cylindrical roller bearing and needle roller bearing.

The chain 5 which transmits rotation of the crankshaft 1 to the cam shaft 3 may be provided by silent chain, but other choices may include roller chain, and bushing chain which is the roller chain without the rollers.

REFERENCE SIGNS LIST 2 drive sprocket
4 driven sprocket
5 chain
7 chain guide
8 chain tensioner
9 chain guide
15 guide base
16 roller shaft
17 roller
17a outer circumferential surface
22 outer ring
22A straight region
22B rounded region
22C flange region
23 bearing roller
25 lubrication hole 25a discharge hole
26 hole
r arc radius

The invention claimed is:

1. A chain guide comprising:
a guide base extending in a traveling direction of a chain;
a plurality of roller shafts attached to the guide base at intervals along the travelling direction of the chain; and
rollers each supported rotatably by one of the roller shafts, each of the rollers having a cylindrical outer circumferential surface for guiding the chain,
wherein the outer circumferential surfaces of the rollers have a cylindricity not greater than 20 μm,
wherein the outer circumferential surfaces of the rollers are disposed lower than end surfaces of the guide base to thereby prevent the moving chain from coming out from between opposed wall surfaces of the guide base.

2. The chain guide according to claim 1, wherein each of the rollers is provided by a roller bearing which includes an outer ring and a plurality of bearing rollers incorporated therein, the outer ring of the roller bearing having its outer circumferential surface serving as the outer circumferential surface of the roller, the outer ring being provided by a heat-treated product, the outer ring has a wall thickness not smaller than 1.0 mm.

3. The chain guide according to claim 2, wherein the outer ring is provided by a shell-type outer ring formed by means of drawing a steel plate, the outer ring having a wall thickness not greater than 3.0 mm.

4. The chain guide according to claim 3, wherein the outer ring includes: a straight region which has a constant outer diameter; a rounded region having an arc-shaped section at each end of the straight region; and a flange region extending radially inward from each of the rounded regions.

5. The chain guide according to claim 4, wherein the rounded region has an arc radius on its outer surface, ranging from 0.5 mm through 1.5 mm.

6. A chain guide comprising:
a guide base extending in a traveling direction of a chain;
a plurality of roller shafts attached to the guide base at intervals along the travelling direction of the chain; and
rollers each supported rotatably by one of the roller shafts, each of the rollers having a cylindrical outer circumferential surface for guiding the chain,
wherein each of the rollers is provided by a roller bearing which includes an outer ring and a plurality of bearing rollers incorporated therein, and the outer ring includes a straight region which has a constant outer diameter and a flange regions extending radially inward at each end of the straight region,
wherein the outer ring has a wall thickness $t_1$ and each of the flange regions has a wall thickness $t_2$ that is smaller than $t_1$, and the outer circumferential surfaces of the rollers are disposed lower than end surfaces of the guide base to thereby prevent the moving chain from coming out from between opposed wall surfaces of the guide base.

7. The chain guide according to claim 6, wherein the outer ring has a width W which is not smaller than 80 percent of a diameter H of the outer ring.

8. The chain guide according to claim 6, wherein the outer ring has a higher hardness than that of the chain.

9. The chain guide according to claim 6, wherein the guide base include a pair of mutually opposed side plates extending along the traveling direction of the chain, and opposing surfaces of the side plates extend beyond the outer circumferential surfaces of the rollers.

10. The chain guide according to claim 6, wherein the outer ring has a finely asperous surface for an improved lubricant holding capability.

11. The chain guide according to claim 1, wherein each of the roller shafts is provided by a heat-treated solid columnar member.

12. A chain drive apparatus comprising: a drive sprocket; a driven sprocket; a chain wound therearound; a pivotable chain guide disposed on a slack side of the chain; and a chain tensioner for pressing the chain guide toward the chain; wherein the chain guide is provided by one of the chain guides according to claim 1.

13. A chain drive apparatus comprising: a drive sprocket; a driven sprocket; a chain wound therearound; a pivotable chain guide disposed on a slack side of the chain; a chain tensioner for pressing the pivotable chain guide toward the chain; and a fixed chain guide on a tension side of the chain; wherein each of the pivotable chain guide and fixed chain guide is provided by the chain guide according to claim 1.

* * * * *